Figure 1:
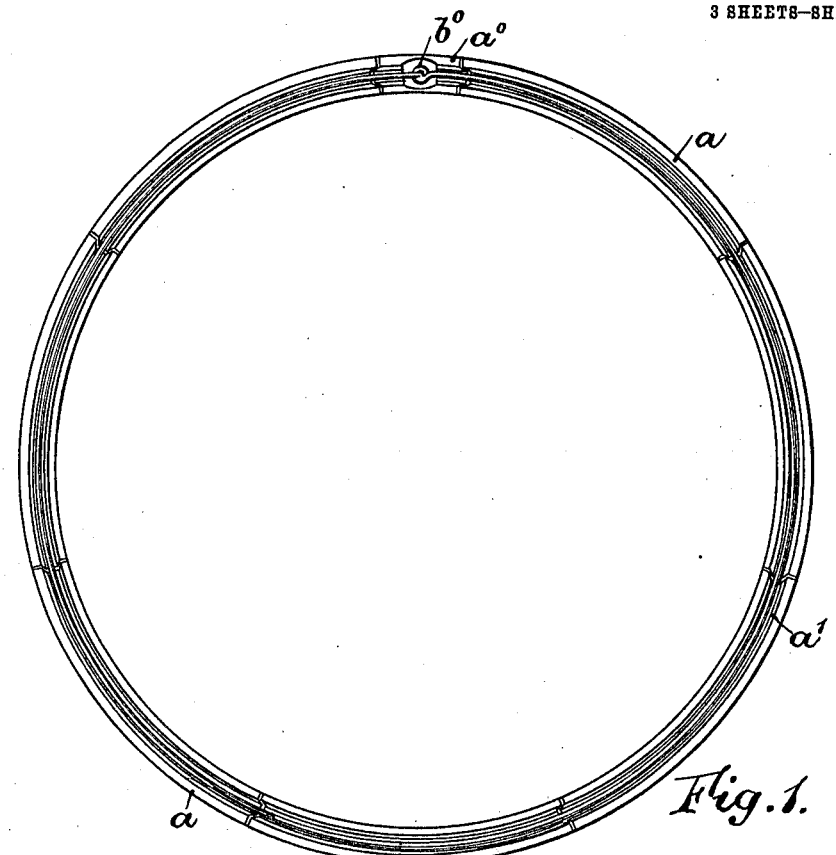

T. M. McALPINE.
MEANS FOR BUILDING AND REINFORCING THE WALLS OF TUNNELS, SHAFTS, AND THE LIKE.
APPLICATION FILED JAN. 4, 1911.

1,004,288.

Patented Sept. 26, 1911.

3 SHEETS—SHEET 1.

WITNESSES

INVENTOR
Thomas Malcolm McAlpine

T. M. McALPINE.
MEANS FOR BUILDING AND REINFORCING THE WALLS OF TUNNELS, SHAFTS, AND THE LIKE.
APPLICATION FILED JAN. 4, 1911.
1,004,288.
Patented Sept. 26, 1911.
3 SHEETS—SHEET 2.
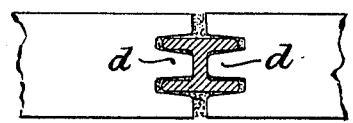
Fig. 3.
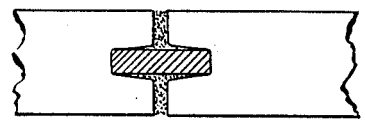
Fig. 4.
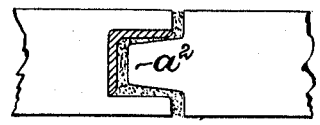
Fig. 5.
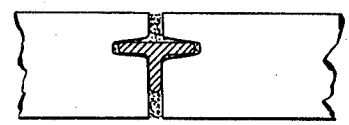
Fig. 6.
Fig. 7.
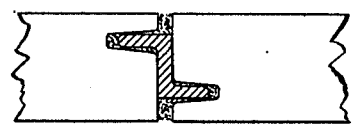
Fig. 8.
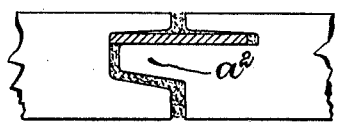
Fig. 9.
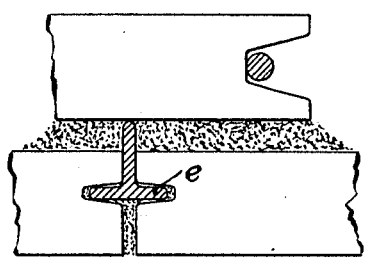
Fig. 13.
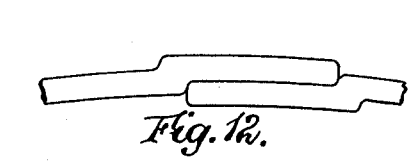
Fig. 10.
Fig. 11.
Fig. 12.
WITNESSES
INVENTOR
Thomas Malcolm McAlpine
BY
ATTY.
COLUMBIA PLANOGRAPH CO., WASHINGTON, D. C.

T. M. McALPINE.
MEANS FOR BUILDING AND REINFORCING THE WALLS OF TUNNELS, SHAFTS, AND THE LIKE.
APPLICATION FILED JAN. 4, 1911.
1,004,288.
Patented Sept. 26, 1911.
3 SHEETS—SHEET 3.
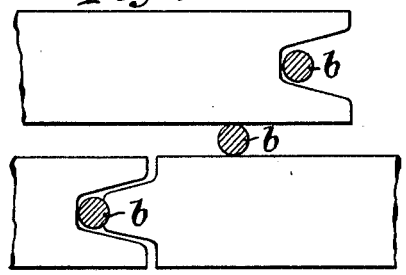
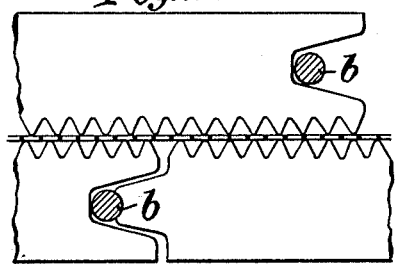
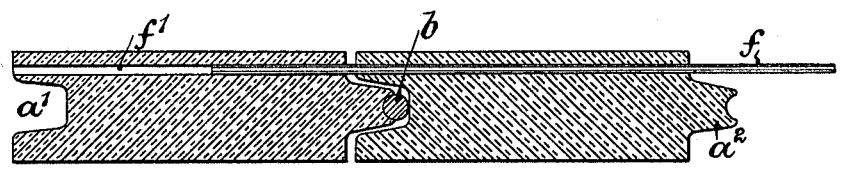
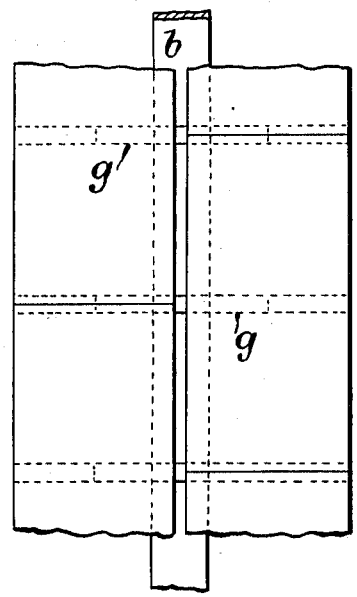
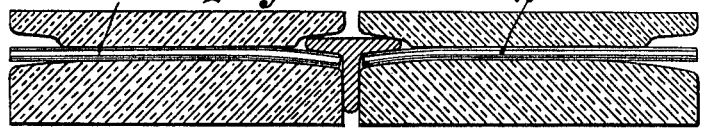
WITNESSES
INVENTOR
Thomas Malcolm McAlpine
BY
ATTY.

UNITED STATES PATENT OFFICE.

THOMAS MALCOLM McALPINE, OF LONDON, ENGLAND.

MEANS FOR BUILDING AND REINFORCING THE WALLS OF TUNNELS, SHAFTS, AND THE LIKE.

1,004,288. Specification of Letters Patent. Patented Sept. 26, 1911.

Application filed January 4, 1911. Serial No. 600,771.

*To all whom it may concern:*

Be it known that I, THOMAS MALCOLM MCALPINE, subject of the King of Great Britain, residing at No. 25 Victoria street, Westminster, London, England, have invented new and useful Improvements in Means for Building and Reinforcing the Walls of Tunnels, Shafts, and the Like, of which the following is a specification.

This invention relates to improved methods of building the curved walls of tunnels, shafts and like tubular structures by means of segmental blocks of concrete or reinforced concrete which are assembled to form complete rings, the several segments which compose a ring being tied together or reinforced by a metal hoop or hoops.

Hitherto with tubular structures built in the above manner, the hoop or hoops have been located outside the thickness of the segments in a more or less exposed manner, thereby necessitating the employment of a relatively excessive quantity of new concrete, applied in the plastic condition, to cover and protect, by embedding, the metal hoops. Now according to the present invention the reinforcing hoops are situated in grooves provided in the abutting surfaces of the rings within the thickness of the concrete segments. By such an arrangement, not only does a much less quantity of new concrete effectively protect the hoops, but also the hoops are laterally inclosed in old solidified concrete with a relatively small amount of clearance. Further, when, as is preferably the case, the hoop is located in the groove which also serves to receive a tongue protruding from an adjoining ring, or, in accordance with a development of this invention, the hoop itself constitutes a tongue-piece occupying grooves provided in the abutting surfaces of two adjoining rings, the quantity of new concrete for embedding the hoop will be reduced to a minimum.

The invention will be more particularly described by reference to the accompanying drawings in which:—

Figure 2:
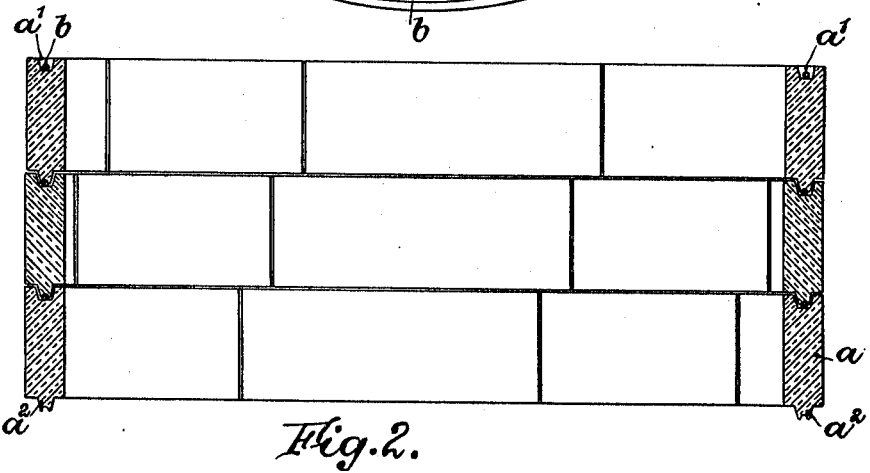

Figure 1 shows an elevation of a transverse joint of a tunnel so constructed as to embody the chief feature of the present invention. Fig. 2 is a longitudinal section of a portion of the tunnel. Figs. 3–9 are longitudinal sections showing other varieties of formation of the reinforced ring-joint. Figs. 10–12 are elevation, sectional elevation and elevation respectively showing various ways of uniting the ends of the reinforcing metal hoop. Figs. 13–15 are longitudinal sections showing portions of a doubly-lined tunnel variously built. Fig. 16 is a longitudinal section showing means for supporting the segments during assembly, and Fig. 17 is an elevation showing a modification thereof. Fig. 18 is a longitudinal section showing longitudinal reinforcing strips.

Referring to Figs. 1 and 2, $a \ldots a$ are circular segments of cement-concrete adapted to engage with one another at their ends, in a known manner, and constitute, when assembled, a complete circular ring. The lowest segment of the ring is formed with a groove at each end, the succeeding segment on each side being formed with a tongue at the lower end and a groove at the upper end, the ring being completed by a segment $a^\circ$ formed with a tongue at each end, this completing segment being preferably of short length. This is inserted by a movement in the direction of the length of the structure. The tunnel excavation is lined by the use of a plurality of such rings situated side by side, and an important portion of this invention relates to the ring-joint which unites consecutive rings of segments. One of the abutting transverse surfaces is formed with a ring-groove or recess $a^1$ and the partner surface of the adjoining ring is formed with a ring-ridge adapted to partially occupy the said ring-groove, the ridge being made up of tongue-pieces $a^2$ projecting from the several segments which compose the ring. The groove is sufficiently deep to receive also a hoop of metal $b$ the ends of which are connected at $b^\circ$ and thereby provide an endless reinforcing hoop embedded in the material of the tunnel lining in a manner which will enable it to be surrounded with cement grout or other semi-liquid or plastic material, and the transverse joint thereby rendered fluid-tight. The union of the ends of the reinforcing hoop can advantageously be effected at a widened portion of the ring-groove which is provided in the relatively short closing segment $a^\circ$. By such means a tunnel can be rapidly constructed and lined with relatively cheap material in a fluid-tight manner and capable of withstanding internal or external pressure, and increased strength may be obtained by a plurality of similarly constructed walls built as will presently be more particularly described, or the inside may be lined with any material as required. Moreover the same method of construction may be employed in the construction of sewers the section of which is of egg-profile shape with the invert of smaller radius. Instead of one ring being tongued into the other, the reinforcing hoop may have such a transverse section as to perform the additional function of tongue-pieces to both adjacent rings.

In Fig. 3 is shown a reinforcing hoop of I section, the flanges of which, on one side of the web, occupy the grooves of one ring while those on the other side occupy the grooves of the adjoining ring.

In Fig. 4, the reinforcing hoop is of plain rectangular section approximately half immersed in each ring.

In Fig. 5, the reinforcing hoop is of L section occupying a portion of the groove of one ring, the tongue-pieces $a^2$ of the adjoining ring occupying the greater part of the remaining portion of the groove.

In Fig. 6 the hoop is of T section there being no tongue-piece. In Fig. 7 it is of channel section with the tongue-piece $a^2$ occupying the hollow of the channel, and in Fig. 8, it is of Z section.

In Fig. 9 a tongue-piece $a^2$ is combined with a hoop of rectangular section immersed partly in both rings.

It will be obvious that reinforcing hoops of other sections with or without the combination therewith of tongue-pieces may be employed.

Figs. 10, 11 and 12 and Fig. 1 show examples of methods of uniting the ends of the hoop to render it continuous; other obvious methods of interconnection may be adopted or alternatively, supposing the reinforcing hoop to be compactly surrounded by cement-concrete it may be unnecessary to effect metallic connection of the ends, reliance being placed on the adherence of the surfaces of the grooves and hoop with the filling material. The ends of the hoop may for example overlap or may be jagged or joggled so as to augment adherence with the filling material.

Fig. 13 shows a portion of a doubly lined tunnel in which one ring of segments surrounds the other, the transverse joint of one ring not coinciding with that of the other. In this combination any of the arrangements of ring-joints above described may be employed. In the figure the web of the T-section reinforcing hoop $e$ of one of the linings is arranged to serve as a distance-piece between it and the surrounding or the inclosed lining, whereby an annular space of uniform width will be provided betweeen the two cylindrical walls which can be filled in with material which will insure the fluid-tightness of the tunnel.

In Fig. 14 there are two linings, one inside the other, each being constructed as shown in Figs. 1 and 2, and interposed between the linings is a similar reinforcing hoop embedded in the filling substance, bitumen, plastic cement, concrete, cement-grout or other suitable substance. In tunnels formed with a plurality of linings, other kinds of reinforcing material may be interposed between the linings, such as wire-strands more or less continuous, wire-netting or expanded metal.

In Fig. 15 is shown a section of a portion of a doubly-lined tunnel in which the surfaces of the segments which are presented toward each other are formed with ring grooves or serrations which serve to retain the interposed material in place. A layer of wire-netting is also interposed to constitute the reinforcing embracing element. In addition to reinforcing the transverse joint of the tunnel rings with hoops, longitudinal reinforcing rods or strips may be employed to strengthen the segments and to strengthen the connection of adjoining rings.

Fig. 16 is a longitudinal section showing an example of such a combination. According to this example the segments of alternate rings are molded with bars $f$ embedded therein with their ends protruding, the segments of the intervening rings being molded with holes $f^1$ adapted to receive the said protruding ends and thereby effect the union of adjoining rings. Such a method of longitudinally stringing together the segments of adjoining rings will enable the segments of the next ring which is about to be built, to be assembled without the use of temporary centering, because temporary support may be derived from the protruding ends of the bars $f$.

According to Fig. 17 the longitudinal reinforcing bars $g$ which penetrate the body of the segments of one ring, serve the further function of acting as tongue-pieces to reinforce the junction of the abutting ends of the segments of the adjacent rings, suitable grooves being provided in those ends to receive the protruding ends of the bars $g$. In this arrangement, straight through orifices may be formed in the center of the length of the segments adapted to receive the reinforcing bars which are added during the process of assembly of the parts of the tunnel-lining. In such a case the bars $g$ may be continuous through a plurality of rings of segments.

In Fig. 18 the longitudinal reinforcing bars $h$ embedded in the segments do not extend beyond the segments, the ends of the bars $h$ being arranged to make metallic engagement with the inwardly directed surface of a flange of the reinforcing hoop in the transverse joint, the segments of the ring being thereby drawn together.

I claim:

1. In a tunnel, shaft, or like tubular structure, a wall built up of rings consisting of concrete segments, each said ring having a groove in an abutting surface thereof within the thickness of said segments and a metal hoop of angle-section located in said groove.

2. In a tunnel, shaft, or like tubular structure, a wall built up of rings consisting of concrete segments, each said ring having a groove in an abutting surface thereof within the thickness of said segments and a metal hoop of angle-section and tongue-piece located in said groove.

3. In a tunnel, shaft, or like tubular structure, a wall built up of rings consisting of concrete segments, each said ring having a groove in both abutting surfaces within the thickness of said segments and a metal hoop of angle section the flanges of which are located in the grooves of adjoining rings.

4. In a tunnel, shaft, or like tubular structure, a wall built up of rings consisting of concrete segments, each said ring having a groove in both abutting surfaces within the thickness of said segments and a metal hoop of angle section the flanges of which are located in the grooves of adjoining rings with the web between said rings.

5. In a tunnel, shaft, or like tubular structure, a wall built up of rings consisting of concrete segments, each said ring having a groove in both abutting surfaces within the thickness of said segments and a metal hoop of T-section the flanges of which are located in the grooves of adjoining rings.

6. In a tunnel, shaft, or like tubular structure, a wall built up of rings consisting of concrete segments, each said ring having a groove in both abutting surfaces within the thickness of said segments and a metal hoop of T-section the flanges of which are located in the grooves of adjoining rings with the web between said rings.

7. In a tunnel, shaft, or like tubular structure, a wall built up of rings consisting of concrete segments, each said ring having a groove in both abutting surfaces within the thickness of said segments and a metal hoop of T-section the flanges of which are located in the grooves of adjoining rings with the web between and protruding beyond said rings.

8. In a tunnel, shaft, or like tubular structure, a wall built up of rings consisting of longitudinally inter-tongued and grooved concrete segments, each said ring having a groove in an abutting surface thereof within the thickness of said segments and a metal hoop of angle-section located in said groove.

9. In a tunnel, shaft, or like tubular structure, a wall built up of rings consisting of longitudinally inter-tongued and grooved concrete segments, each said ring having a groove in an abutting surface thereof within the thickness of said segments and a metal hoop of angle-section and tongue-piece located in said groove.

10. In a tunnel, shaft, or like tubular structure, a wall built up of rings consisting of longitudinally inter-tongued and grooved concrete segments, each said ring having a groove in both abutting surfaces within the thickness of said segments and a metal hoop of angle section the flanges of which are located in the grooves of adjoining rings.

11. In a tunnel, shaft, or like tubular structure, a wall built up of rings consisting of longitudinally inter-tongued and grooved concrete segments, each said ring having a groove in both abutting surfaces within the thickness of said segments and a metal hoop of angle section the flanges of which are located in the grooves of adjoining rings with the web between said rings.

12. In a tunnel, shaft, or like tubular structure, a wall built up of rings consisting of longitudinally inter-tongued and grooved concrete segments, each said ring having a groove in both abutting surfaces within the thickness of said segments and a metal hoop of T-section the flanges of which are located in the grooves of adjoining rings.

13. In a tunnel, shaft, or like tubular structure, a wall built up of rings consisting of longitudinally inter-tongued and grooved concrete segments, each said ring having a groove in both abutting surfaces within the thickness of said segments and a metal hoop of T-section the flanges of which are located in the grooves of adjoining rings with the web between said rings.

14. In a tunnel, shaft, or like tubular structure, a wall built up of rings consisting of longitudinally inter-tongued and grooved concrete segments, each said ring having a groove in both abutting surfaces within the thickness of said segments and a metal hoop of T-section the flanges of which are located in the grooves of adjoining rings with the web between and protruding beyond said rings.

15. In a tunnel wall built up of rings consisting of concrete segments, a bottom segment formed on both longitudinal abutting surfaces with a groove, a top segment formed on both longitudinal abutting surfaces with a tongue and intermediate segments each formed on one longitudinal abutting surface with a groove and on the other longitudinal abutting surface with a tongue.

16. In a tunnel wall built up of rings consisting of concrete segments, means for supporting said segments during assembly consisting of bars embedded in said segments and protruding longitudinally therefrom.

In testimony whereof I have signed my name to this specification in the presence of two subscribing witnesses.

T. MALCOLM McALPINE.

Witnesses:
H. W. WAGHORN,
C. P. LIDDON.

Copies of this patent may be obtained for five cents each, by addressing the "Commissioner of Patents, Washington, D. C."